United States Patent
Kuechler

(10) Patent No.: US 9,448,967 B2
(45) Date of Patent: Sep. 20, 2016

(54) STREAM DATA PROCESSOR

(71) Applicants: MStar Semiconductor, Inc., Hsinchu Hsien (TW); MStar Semiconductor, Inc., Grand Cayman (KY); MStar Software R&D (Shenzhen) Ltd., ShenZhen (CN)

(72) Inventor: Wolfgang Kuechler, Hertfordshire (GB)

(73) Assignees: MStar Semiconductor, Inc. (TW); MStar Semiconductor, Inc., Grand Cayman (KY); MStar Software R&D (Shenzhen) Ltd., Shenzhen (CN)

(*) Notice: Subject to any disclaimer, the term of this patent is extended or adjusted under 35 U.S.C. 154(b) by 397 days.

(21) Appl. No.: 13/687,102

(22) Filed: Nov. 28, 2012

(65) Prior Publication Data
US 2014/0123148 A1 May 1, 2014

(51) Int. Cl.
*G06F 13/00* (2006.01)
*G06F 15/80* (2006.01)

(52) U.S. Cl.
CPC ................................ *G06F 15/8015* (2013.01)

(58) Field of Classification Search
CPC .................................................. G06F 15/8015
USPC .......................................................... 710/104
See application file for complete search history.

(56) References Cited

U.S. PATENT DOCUMENTS

| | | | |
|---|---|---|---|
| 4,117,536 A * | 9/1978 | Bodner | 712/226 |
| 7,010,538 B1 * | 3/2006 | Black | 707/636 |
| 7,100,020 B1 * | 8/2006 | Brightman et al. | 712/18 |
| 2002/0152060 A1 * | 10/2002 | Tseng | G06F 13/22 703/17 |
| 2005/0168634 A1 * | 8/2005 | Wyman et al. | 348/448 |
| 2005/0253074 A1 * | 11/2005 | Jones et al. | 250/363.04 |
| 2006/0161696 A1 | 7/2006 | Anjo et al. | |
| 2006/0242429 A1 * | 10/2006 | Holtzman | G06F 21/72 713/189 |
| 2007/0136282 A1 * | 6/2007 | Takashima | 707/6 |
| 2009/0273365 A1 * | 11/2009 | Shin | 326/37 |
| 2010/0189166 A1 * | 7/2010 | Mori | 375/219 |

FOREIGN PATENT DOCUMENTS

| | | |
|---|---|---|
| CN | 1586063 A | 2/2005 |
| CN | 100539575 C | 9/2009 |

OTHER PUBLICATIONS

Gerald Estrin, "Reconfigurable Computer Origins: The UCLA Fixed-Plus-Variable (F+V) Structure Computer", IEEE Annals of the History of Computing, 2002, 7 pages.
Todman et al., "Reconfigurable computing: architectures and design methods", IEE Proc.-Comput. Digit. Tech., vol. 152, No. 2, Mar. 2005, pp. 193-207.
Henrik Svensson, "Reconfigurable Architectures for Embedded Systems", Lund, Sep. 2008, 183 pages.
Taiwan Office Action, Oct. 22, 2015, 9 pages.

\* cited by examiner

*Primary Examiner* — Henry Tsai
*Assistant Examiner* — John Roche
(74) *Attorney, Agent, or Firm* — Edell, Shapiro & Finnan, LLC

(57) ABSTRACT

Techniques are provided aimed at improving the flexibility and reducing the area and power consumption of digital baseband integrated circuits by using stream data processor based modem architecture. Semiconductor companies offering baseband ICs for handsets, face the challenges of improving die size efficiency, power efficiency, performance, time to market, and coping with evolving standards. Software defined radio based implementations offer a fast time to market. Dedicated hardware designs give the best die size and power efficiency. To combine the advantages of dedicated hardware with the advantages of conventional software defined radio solutions the stream data processor is partitioned into a stream processor unit, which implements processing functions in dedicated hardware and is hence die size and power efficient, and a flexible stream control unit which may be software defined to minimize the time to market of the product.

12 Claims, 7 Drawing Sheets

STREAM DATA PROCESSOR

FIELD OF THE INVENTION

The present disclosure relates to data processors in computing systems and more particularly to techniques aimed at improving the flexibility and reducing the area and power consumption of digital baseband integrated circuits in wireless communications systems by using a stream data processor based modem architecture.

BACKGROUND OF THE INVENTION

Semiconductor companies offering baseband ICs for handsets, face the following challenges: die size, power efficiency, performance, time to market, inter-/intra-RAT (Radio Access Technology) multimode support and evolving standards. Dedicated hardware designs have been used in the past, because they give the best die size and power efficiency. A recent trend is to employ software-defined radio (SDR) based implementations, because they offer a fast time to market. Which methodology is the most advantageous depends on the product requirements. Product requirements do however tend to change over time. Flexibility is typically very important for an early solution, whereas die size and power efficiency matter most for a mature solution. What is needed is a data processor that offers a straight forward migration path from a flexible solution to a die size and power efficient solution.

An SDR system is a radio communication system implemented by means of software on an embedded system. While the concept of SDR is not new, the rapidly evolving capabilities of digital electronics render practical many processes which previously were only theoretically possible.

The prior-art technologies that have been used to implement SDR solutions are Coarse Grain Reconfigurable Arrays (CGRA), Digital Signal Processors (DSP), and Reconfigurable Computing Platforms (RCP).

CGRAs offer high processing power, and high flexibility, with re-configurable Data Processing Units (rDPU), and a configurable communication fabric where the configurability is on a word or operand level ("Reconfigurable computing: architectures and design methods", T. J. Todman, G. A. Constantinides, S. J. E. Wilton, O. Mencer, W. Luk and P. Y. K. Cheung, 2005).

There are many different CGRA implementations. A CGRA may utilise hundreds or only a handful of rDPUs, and may be homogenous, where all the rDPUs are the same, or heterogeneous where different rDPUs are specialised for different tasks. The rDPU capability can range from a minimal Arithmetic Logic Unit (ALU) or buffer, to a complete processor. The re-configurability can also differ greatly between different implementations.

The problem with CGRA is that it is very difficult to, e.g., implement software tools that map high level C code onto the platform in an efficient way. The software designer is instead required to understand the platform in detail and write specific software tailored to the CGRA.

DSPs have a long history in the field and are typically used for the implementation of GSM baseband receivers. DSPs are optimised to process large amounts of data rather than executing control code. High data throughput is achieved by exploiting parallelism in the algorithm. There are several architectural approaches to do this. The most die size efficient and hence most relevant for embedded systems are Very Long Instruction Word (VLIW) to exploit instruction parallelism, Single Instruction Multiple Data (SIMD) to exploit data parallelism, multithreading to exploit task parallelism and command execution pipelining to increase throughput.

In a VLIW architecture, several commands for several functional units are issued in parallel. The most straight forward implementation of the VLIW architecture is a 3-way VLIW that allows Data-Load, Arithmetic and Data-Store to happen concurrently. More advanced implementations allow concurrent independent operation of multiple ALUs. All interdependencies are statically resolved by the compiler and there is no dedicated hardware required to detect and handle interdependencies. This makes the VLIW architecture attractive for embedded solutions. One issue with VLIW architectures is that they are quite inefficient at implementing data parallelism from an instruction code size point of view. One separate instruction for each functional unit is always required, even if the same operation is performed multiple times, due to data parallelism. Code size is a very important issue for embedded solutions and the SIMD architecture is a straight forward solution to this problem.

In the SIMD architecture, the same command is executed on the different elements of a data vector. The processor operates on a vector file, rather than a register file, in which the vectors are typically relatively short. A vector register is usually between 64 and 512 bits wide, which corresponds to between 4 and 32 16-bit vector elements. Long data vectors have to be split up into shorter vectors of the natively supported size before they can be processed.

Almdahl's law states that there is an upper limit to the effectiveness of the speeding up of subtasks. One way of combating this limit is to exploit instruction parallelism. VLIW architecture is quite often employed to control a scalar unit, an SIMD unit and an address generation unit. VLIW allows the simultaneous data load, data store, control code execution and vector data processing.

Multithreading means that independent software tasks can be executed in parallel and is commonly implemented by time-sharing the processor core. This is not very helpful in the embedded context, because time-sharing increases overhead. For an SDR solution, there are typically hard time limits by which a certain number of tasks must have completed. It is normally not important that tasks can run concurrently. Multithreading can however be used to utilise functional units that would otherwise be idle. The VLIW architecture lends itself to this optimisation. Another way of implementing multithreading is to allow different tasks to occupy different stages of the command pipeline.

An RCP combines one or more conventional processors with one or more reconfigurable processing units (G. Estrin, "Reconfigurable computer origins: The UCLA fixed-plus-variable (F+V) structure computer," IEEE Annals of the History of Computing, vol. 24, no. 4, pp. 3-9, 2002).

The most straight forward way of speeding up a system is via duplication. The task is split up in sub-tasks, which are executed in parallel. This is however quite expensive. The maximal speedup achievable in practice is limited by the interdependencies within the sub-tasks.

A reconfigurable architecture on the other hand allows the speeding up of the individual sub-functions. The cost for the extra hardware is limited due to the reuse. A big advantage of this approach is that interdependencies between subtasks do not matter, because they are still executed in sequence. Almdahl's law does however put an upper limit on the achievable overall speed increase.

One driver for the RCP architecture is that the overall modem processing consists of a sequence of computational kernels (e.g. FFT, Demodulation, and Decoding). A computational kernel typically implements a tight loop that processes a block of data. Data transfer between these kernels is relatively small. The problem can be separated into two tasks. One task is to implement the kernel. This is ideally done by reconfigurable hardware which executes each computational kernel efficiently. The second task is to reconfigure the hardware and schedule the execution of the kernels. This task is implemented by a conventional processor.

There are four basic options for connecting the reconfigurable hardware to the processor, externally, or via a processor bus, coprocessor or register file (see Reconfigurable Architectures for Embedded Systems, Henrik Svensson, 2008).

The most suitable connection depends on the granularity of the operation of the reconfigurable hardware. An external connection can be used if the reconfigurable hardware is implemented in a field-programmable gate array (FPGA) and does not need to access the processor memory directly. The processor bus is an option if the reconfigurable hardware implements a whole kernel and data can be transferred via Direct Memory Access (DMA) to and from the processor memory. Alternatively the reconfigurable hardware can be instantiated as a coprocessor with direct access to the processor cache. Finally the reconfigurable hardware can also be a functional unit of the processor and operate directly on the register file.

One advantage of dedicated hardware solutions is that the operand bit widths can be optimised for each specific application. This minimises the die size of the logic as well as the size of the associated memory. SDR solutions are commonly limited to using 8, 16, 32 and 64 bit operands. It is unlikely that this matches exactly with the actual needs of the processing being implemented. SDR solutions hence use larger than necessary operands and are hence less die size and memory area efficient than dedicated hardware.

Die size and power efficiency are crucial for mobile devices. For a processor based solution this is directly related to the code size and the operand width. Prior-art technologies that have been used to implement SDR solutions utilise processors that implement elementary operations, short vectors and standard operand widths. The Stream Data Processor (SDP) solution improves die size and power efficiency by using high level operations, data stream operands and tailored operand widths. A data stream is a data sample sequence of arbitrary length. High level operations and data stream operands reduce the number of instructions. Tailored operand widths reduce the size of the data memory and the processing function.

The SDP operates on data streams and can access data stream elements in random order. This allows the efficient implementation of a range of high level functions such as de-interleaving, sorting, and matrix operations. Interleaving is a standard technique to distribute errors evenly over large data packets and is typically used on multiple levels in telecommunication standards. The digital baseband has to perform de-interleaving operations, but this is difficult to implement efficiently on a processor that operates on short vectors, as multiple iterations of shuffle operations are required to process large data packets. The SDP can however de-interleave a large data packet efficiently in a single pass.

The SDP based architecture offers a fast time to market with a straight forward migration path to dedicated hardware, and can be prepared during algorithm development as soon as the basic processing functions are known. The dedicated hardware implementation of the processing elements and functions can be developed and tested in parallel with the algorithm development. The sequencing of the functions can remain programmable for an early platform. Once the algorithm has been frozen, the sequencing can be implemented in dedicated hardware which is more die size and power efficient. This enables the development of a processing engine with flexibility, tailored to the application to be targeted.

SUMMARY OF THE INVENTION

The embodiments of the invention described herein utilise a plurality of stream data processors (SDPs) to implement a flexible computing system that is capable of processing large amounts of data in a power and die size efficient way. One application of the invention is to implement a digital baseband integrated circuit for wireless communications systems.

To combine the advantages of dedicated hardware with the advantages of conventional SDR solutions, each of a plurality of SDPs is partitioned into one or more Stream Processor Units (SPU) and a Stream Control Unit (SCU). The SPU implements processing functions in dedicated hardware and is hence die size and power efficient. The bit width of the operands can be optimised for the specific application being targeted. The size of the data memory associated with the SPU is comparable to that used if the complete baseband was implemented using dedicated hardware. This makes the SDP solution much more die size efficient than a conventional SDR solution.

The SCU performs the sequencing of the processing functions. There are different implementation options for the SCU which range from the flexibility of a conventional SDR solution to the die size efficiency of a dedicated hardware solution. A flexible software defined SCU can be chosen to minimise the time to market of the product. An SCU based on dedicated hardware can be used for later versions of the product, to minimise die size.

Each SDP can be fed by one or more input data streams from external or internal sources, such as other SDPs or dedicated hardware. The data streams can consist of digital data signals that require processing or can correspond to the operands required during the processing. The output data streams can either be written to the data memory of the SDP or output via data interfaces to external or internal recipients.

The input data interfaces and output data interfaces are flexible and allow the connection of dedicated hardware or another SPU, on the receiving data stream. This includes connection of data first in, first out (FIFO) modules, data buffers consisting of either direct memory access or arbitrated memory access, or time multiplexing between any of the above connections.

The SPUs contained within each SDP consists of one or more processing elements, each consisting of one or more processing function circuits that are fed by one or more input data streams. The data streams can either be operand data read from the data memory or data from the external input interfaces. The output from the processing elements can be passed to the external data output interfaces or applied to the data memory via hardware arbiters which employ an arbitration scheme to share memory access between data streams. Examples of processing functions that are performed include FFT/IFFT, vector and matrix operations, sorting and filter functions.

In one embodiment, each of the data streams can be distributed across all the data memories. By employing a suitable address decoding scheme, the SCU then has no need to know the total number of memories. In another embodiment, each data stream is applied to a different single data memory. In this case the SCU must have knowledge of the total number of memories.

The SCU provides the configuration data for the SPU. One SCU solution is to use a dedicated microprocessor to configure one or more SPUs. A configuration register block implements a double buffer enabling the SPU to operate using one configuration whilst the next is prepared, thus minimising SPU idle time. One advantage of using a microprocessor as the configuration controller is that the SPU and the microprocessor can share the data memory reducing data transfer overhead.

Another SCU solution involves using a finite state machine (FSM) to read configuration sequences from a FIFO which is refreshed by a higher level processor such as a DSP. Alternatively, an FSM can be used to read configuration sequences from a ROM and apply them to the SPU. Another option is to derive the configuration sequence operations directly via FSMs designed in dedicated hardware or re-configurable hardware.

The SDP operates on streams that are passed from sources external to the SDP, from the SDP to external recipients and between blocks internal to the SDP. An RVG (Ready, Valid, Go) interface is used to pass a stream from a sender to a receiver. A transfer can only complete, if all receivers are ready and all sender output data is valid. The RVG interface provides a flexible method of connecting synchronous blocks.

SDR based implementations offer a fast time to market. Dedicated hardware designs usually lead to the best die size and power efficiency. There is however no straight forward migration path between these two methodologies. A computing system based on a plurality of SDPs solves this problem. Each SDP is separated into an SPU implemented in dedicated hardware for data processing and an SCU for configuration. The SPU is die size and power efficient. Different implementation options for the SCU offer a trade-off between flexibility and die size and power efficiency.

BRIEF DESCRIPTION OF THE DRAWINGS

For a better understanding of the present invention, reference is made, by way of example, to the following drawings. It is to be noted, however, that the appended drawings illustrate only typical embodiments and are not to be considered limiting of its scope.

DESCRIPTION OF EXAMPLE EMBODIMENTS

Figure 1:
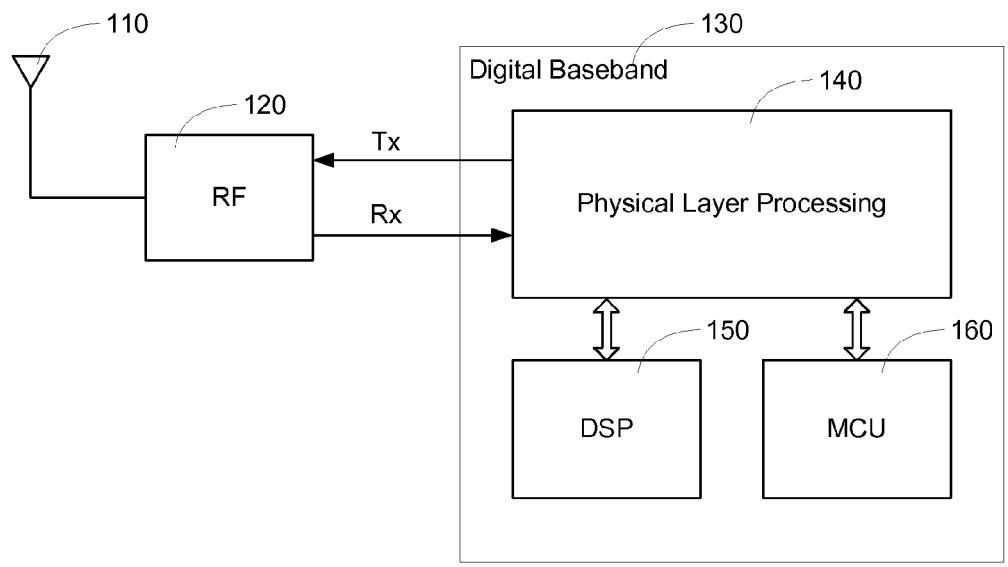
FIG. 1 shows a simplified block diagram of a digital baseband solution in which embodiments of the present invention may be implemented.

The digital baseband (DBB) part of a User Equipment (UE) handles the digital signal processing required in the physical layer (PHY) of the UE's radio system. FIG. 1 shows a simplified block diagram of a digital baseband solution that may be configured in accordance with embodiments described herein. The antenna 110 and RF module 120 of the UE handle the radio frequency data transmission and reception including up-converting the baseband signal for transmission and down-converting the received signals into a baseband signal. The digital data processing is handled by the digital baseband module 130, which typically comprises a physical layer processing unit 140, a DSP 150, and a microcontroller unit (MCU) 160. The MCU is used to control the functions of the DBB while the DSP is used for further signal processing not handled by the PHY layer.

In order to achieve the low cost and power consumption required, the digital baseband processing must be optimized for the types of operations that are required. In order to fulfil these requirements, a PHY layer must be implemented such that it is modular, scalable and expandable. Modules are used to assemble a specific PHY layer implementation that covers the required functionality. A new application may require the addition of new modules. These new modules will then be available for future PHY layer implementations.

Figure 2:
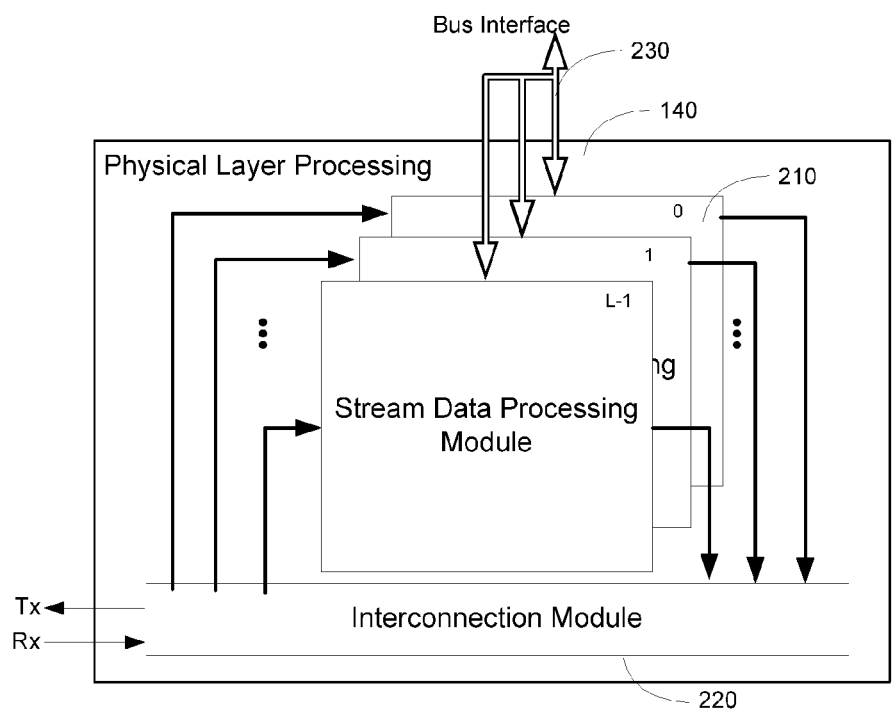
FIG. 2 shows a simplified block diagram of the embodiment of the physical layer processing unit.

FIG. 2 shows a block diagram of the embodiment of the physical layer processing unit 140, comprising a plurality of stream data processor (SDP) modules 210(0) to 210(L-1), and an interconnection module 220 connecting the transmit and receive data streams with the SDP modules. The interconnection module is also used to pass the data streams between the stream data processing modules. The top level configuration interface (Bus Interface 230) is used by a higher level processor, such as the DSP 150 or the MCU 160 in FIG. 1, to configure the SDP instances.

Figure 3:
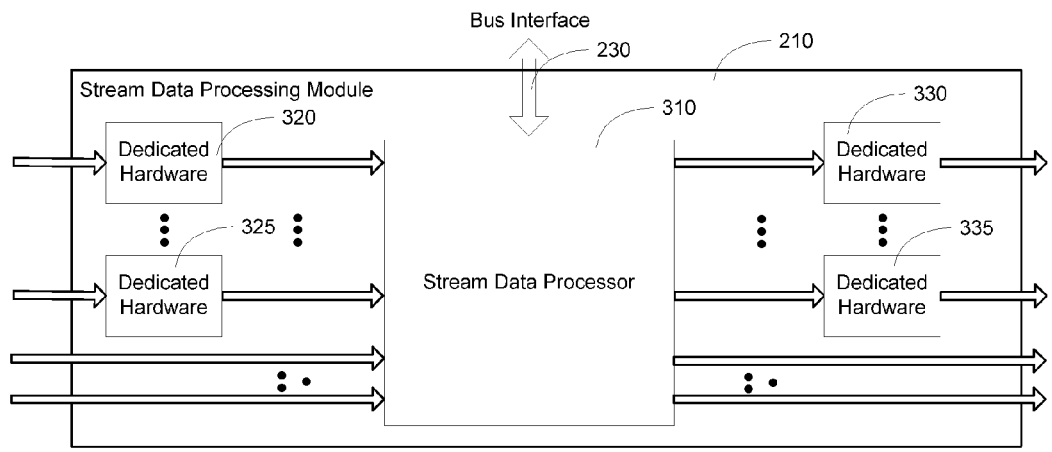
FIG. 3 shows a simplified block diagram of the embodiment of the stream data processing module.

FIG. 3 shows a block diagram of the stream data processing module 210, comprising an SDP 310, one or more instances of dedicated hardware input circuitry and one more instances of dedicated hardware output circuitry. The dedicated hardware blocks 320, 325, connected to the inputs, can typically fulfil filter or FFT functions, while the dedicated hardware blocks 330, 335, connected to the outputs, typically fulfil encoder, decoder, demodulator or interface functions. The input and output data streams can also be connected directly to the SDP from external sources.

Figure 4A:
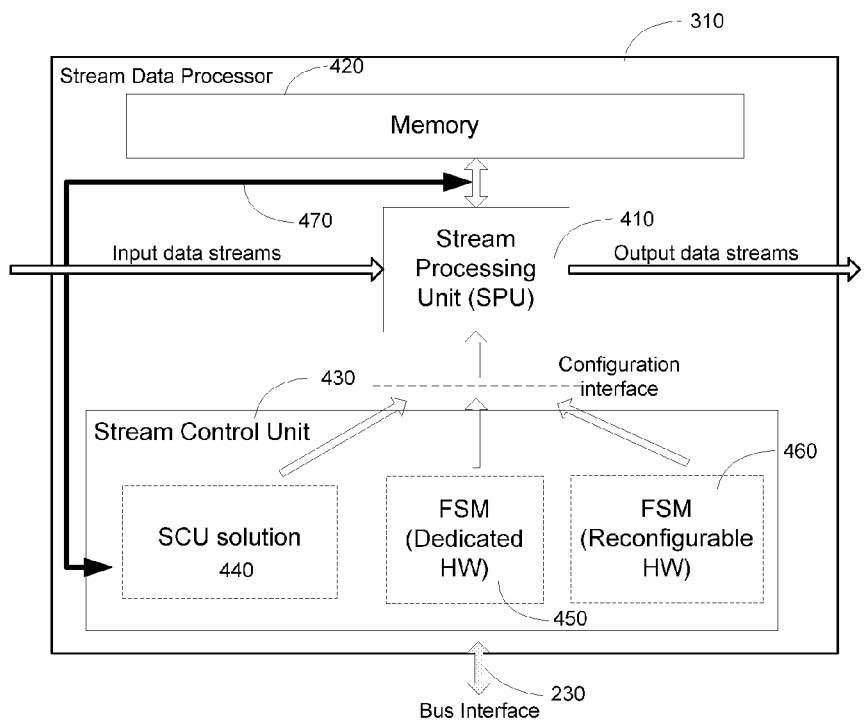
FIG. 4(A) shows a simplified block diagram of the embodiment of the stream data processor.

FIG. 4(A) shows a simplified block diagram of the SDP 310. The central core of the SDP is the stream processor unit (SPU) 410. The SPU 410 is served by an associated bank of memory 420, and a stream control unit (SCU) 430 which provides the configuration data for the SPU 410. The SPU 410 acts as a slave that can be configured by different types of SCU solutions 440, 450 and 460, which are described below.

Figure 4B:
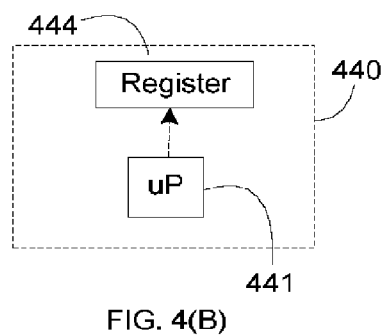
FIGS. 4(B) to 4(E) show simplified block diagrams of different embodiments of the stream control unit solutions.

One SCU solution 440 is to use a dedicated microprocessor 441 to configure one or more SPUs, as shown in FIG. 4(B). In one embodiment of the invention, the microprocessor heap can be implemented using the memory 420 and is then accessible by both the microprocessor 441, via the memory access path 470, and the SPU 410. Since operands are stored on the heap, operations can be performed by the microprocessor 441 or the SPU 410 without any data transfer overhead. Hence, the microprocessor 441 can also perform processing functions that have not been implemented in the SPU 410.

The configuration register 444 typically implements a double buffer. The SPU 410 can then operate using one configuration, while the next configuration is prepared. This minimises the idle time of the SPU 410 between consecutive operations.

Figure 4C:
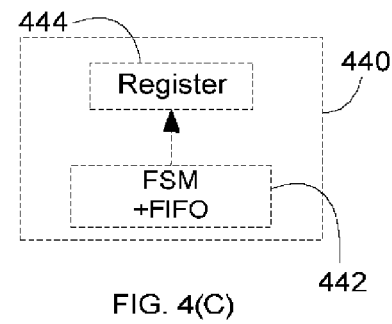

In another embodiment of SCU solution 440, the SPU can be used without a dedicated microprocessor. As shown in FIG. 4(C), a solution that allows some flexibility is to read a sequence of configurations using a finite state machine (FSM) coupled with a large instruction FIFO 442. An algorithm can be implemented as a sequence of configurations that can either be predetermined or derived in real-time, with the FIFO filled at regular intervals by a higher level processor, such as the DSP 150 or the MCU 160.

Figure 4D:
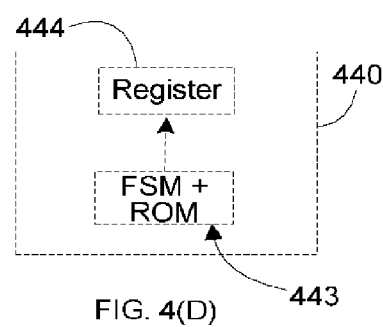

It is shown in FIG. 4(D) another embodiment of SCU solution 440. It is to read a sequence of configurations, using a finite state machine (FSM) coupled with a read only memory (ROM) 443, and to apply them to the SPU. An FSM implemented in dedicated hardware can be used to configure one operation after another and poll the required registers.

Other SCU solutions can use a FSM designed in dedicated hardware 450 or reconfigurable hardware 460 to fulfil all the configuration sequence operations. All of the solutions using an FSM require the SPU to perform all of the processing functions.

Figure 4E:
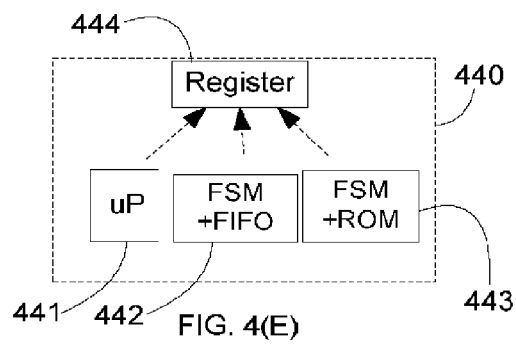

FIG. 4(E) demonstrates another embodiment of SCU solution 440, where SCU solution 440 uses a combination of some of the previous solutions, 441, 442, and 443, in parallel. One example is to employ several dedicated HW FSMs to handle parallel tasks, with a dedicated microprocessor 441 to provide flexibility for other tasks, and a large instruction FIFO 442 for tasks that are configured by a higher level processor. A suitable arbitration scheme must be employed to arbitrate the SPU configurations.

The SCU implements an algorithm by configuring a sequence of processing element operations. The SCU can also implement several different concurrent algorithms and share the processing capabilities of the SPU between them. Each algorithm can be viewed as a task, which may depend on other tasks. An SCU implementation can employ multitasking to configure concurrent processing element operations. An arbitration scheme for processing element configurations can be used to share processing element resources between multiple tasks. FIFOs can be utilised to implement inter-task communication.

The data bit width of the streams processed by the SPU can be tailored to the application. This minimises the die size of the SPU 410 and the associated memory 420.

Figure 5A:
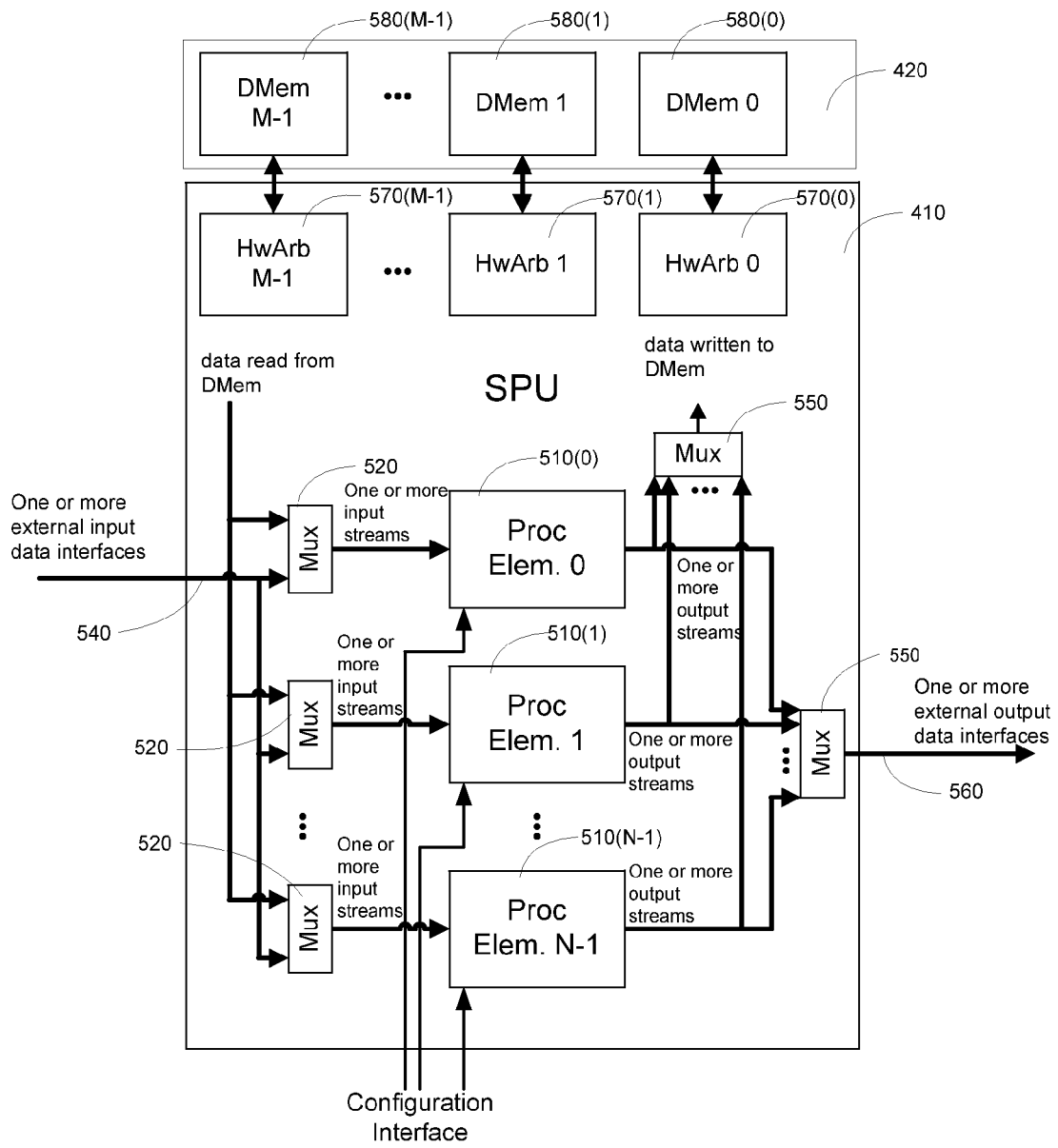
FIG. 5(A) shows a block diagram of the embodiment of the stream processor unit.

FIG. 5A shows a block diagram of the stream processor unit (SPU) 410 in the embodiment of the present invention. The SPU 410 implementation contains one or more processing elements N 510(0) to 510(N-1), each fed by one or more input data streams. The input data streams are selected, using multiplexers 520, from either operand data read from the data memory 580(0) to 580(M-1), which forms part of the memory 420, or one or more external input data interfaces 540. The one or more output data streams from the processing elements 510 are multiplexed in 550, and are either written to the data memory 580, or output to one or more external output data interfaces 560. Access to the data memory is controlled by hardware arbiters 570(0) to 570(M-1).

Each hardware arbiter 570 employs an arbitration scheme to share memory accesses between concurrent data streams that flow to and from the memory.

The input data is routed by the multiplexer to one of the processing elements for processing and to transfer the data into the data memory. Some processing elements may provide a bypass mode which allows the direct transfer of data to the data memory.

Each processing element 510 can perform one function at a time, and is configured independently by the SCU 430. The different processing elements can operate independently, can run in parallel and can share the same data memories 580.

Figure 5B:
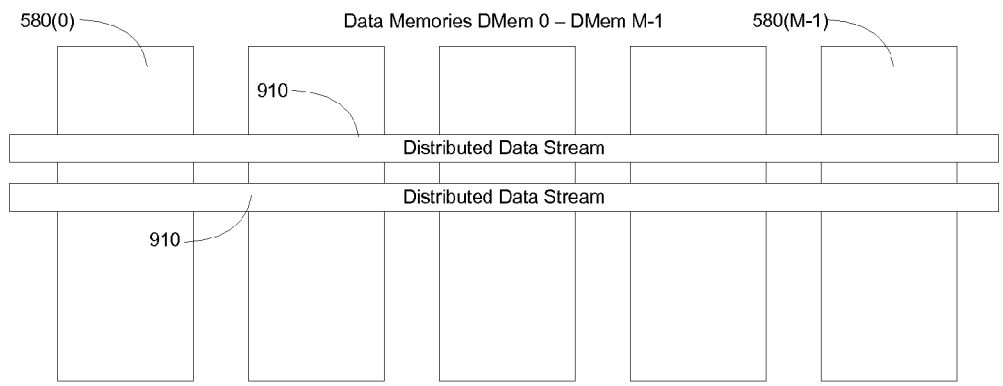
FIG. 5(B) shows a graphical representation of distributed data stream handling within the data memories.
Figure 5C:
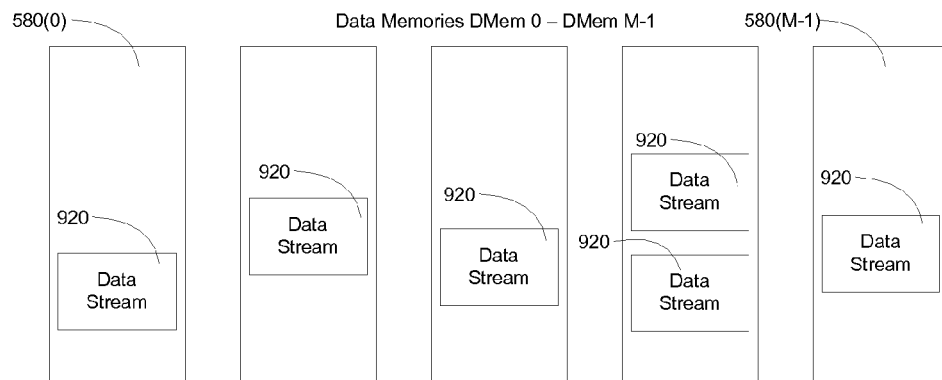
FIG. 5(C) shows a graphical representation of data stream handling within single data memories.

FIG. 5B and FIG. 5C illustrate two possible embodiments for the mapping of the different data streams to the data memories 580(0) to 580(M-1). According to the embodiment presented in FIG. 5B, each data stream 910 can be distributed across all the data memories. In another embodiment, depicted in FIG. 5C, each data stream 920 can be applied to a single data memory. In this case the SPU and microprocessor must have knowledge of the total number of memories.

There are many ways of allocating the memory address space for the stream data such that the data stream 910 is distributed across multiple data memories 580. Each memory address (MemAddr) plus memory instance (MemIdx=0, 1, M-1) gets mapped to one address in a "data stream address space" (DSAddr). One possibility is to map DSAddr=MemAddr*M+MemIdx. The address decoding requires a division by M and can be simplified significantly if M is a power of 2. The SPU and the microprocessor can operate on the "data stream address space" and are blind to the actual number of memories. The throughput of the SPU typically increases with M, however this improvement depends on the processing function utilised. The Rd and Wr blocks can access the memories concurrently via hardware arbiters. Each arbiter is associated with one memory and employs an arbitration scheme (e.g. round robin arbitration). The number of data memories is transparent to the microprocessor, the Rd blocks, the Wr blocks and the processing functions. The number of memories does not affect the functionality, only the throughput.

In the case where each data stream 920 resides in a single memory 580, care must be taken about the memory location used for the data stream in order to avoid blocking. Blocking conditions can occur if different data streams that are required concurrently for an operation are located in the same memory as only one stream can be accessed at a time. Blocking conditions limit the throughput of the system.

If a dedicated microprocessor is used to configure an SPU instance then operands are directly accessible from the microprocessor and the SPU. This simplifies the writing of C code for the microprocessor, because the C pointers to the operands can be used directly to configure the SPU. It also means that data processing can be performed with the microprocessor and the SPU, without the overhead of transferring data between the processors. The microprocessor can perform processing functions that have not been implemented in the SPU. Memory access 470 by the microprocessor has priority over the SPU accesses. The SPU memory arbiters are stalled when the microprocessor accesses the data memory.

The external input data interfaces and external output data interfaces are flexible and allow the connection of dedicated hardware, or another SPU, on the receiving data stream. This includes connection of data FIFO modules, data buffers consisting of either direct memory access or arbitrated memory access, or time multiplexing between any of the above connections.

The SDP operates on streams. Streams are passed from external sources to the SDP, from the SDP to external recipients and between blocks internal to the SDP. An RVG (Ready, Valid, Go) interface is used to pass streams between all external and internal interfaces from one block, acting as a sender, to another block, acting as a receiver.

Figure 6:
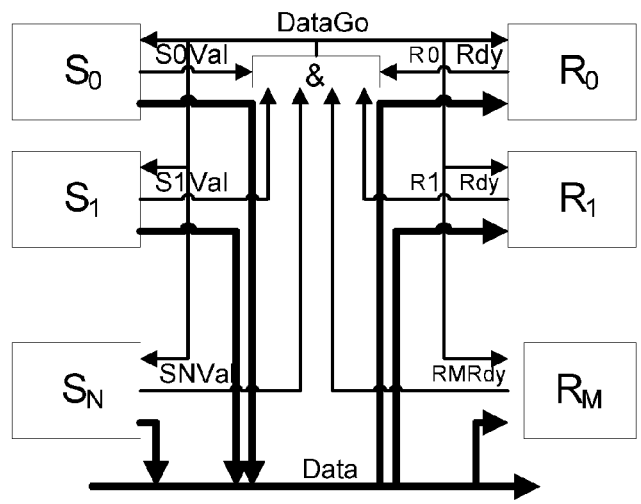
FIG. 6 shows a simplified block diagram of the Ready, Valid, Go interface.
Figure 7:
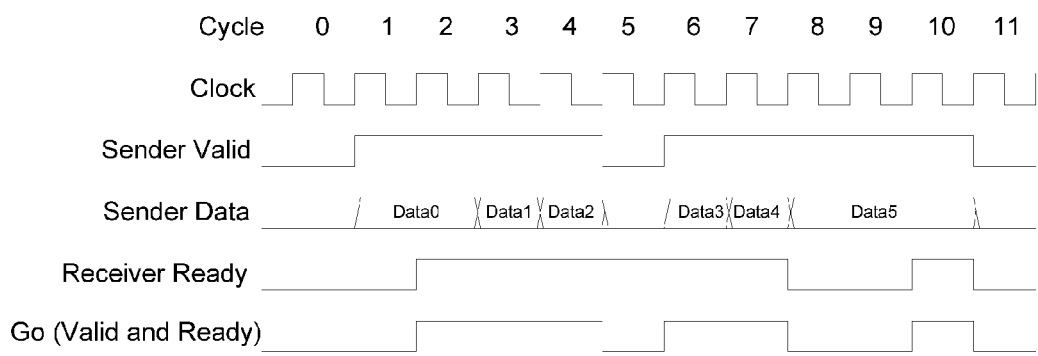
FIG. 7 shows a typical timing diagram for the Ready, Valid, Go interface.

FIG. 6 shows a simplified block diagram of the RVG interface describing how multiple receivers $R_0$-$R_N$ and multiple senders $S_0$-$S_N$ may be connected. FIG. 7 shows the typical timing for the RVG interface. A transfer can only complete, if all receivers are ready and all sender output data is valid. The RVG interface provides a flexible method of connecting synchronous blocks. The interface supports continuous single cycle transfers. Rdy, Val, and Go are the required control signals.

The sender provides a Data output, a Valid output (Val) and reads a Go input. The sender activates Val when it has new data and can then provide the new data when the Go input is activated. The Data must be kept constant and the Val activated until the Go input is activated.

The receiver provides a Rdy output and reads a Data input and a Go input. The receiver activates the Rdy output when it is ready for new data and then samples the data when the Go input is activated. The Rdy must be kept activated until the Go input is activated. The receiver and the sender must not have combinatorial paths between the Go input and the Rdy/Val output.

Connecting the data ports and generating the Go signal allow the receiver and the sender to transfer data. The Go signal can be derived by combining the Val and the Rdy with a logical AND gate.

Figure 8:
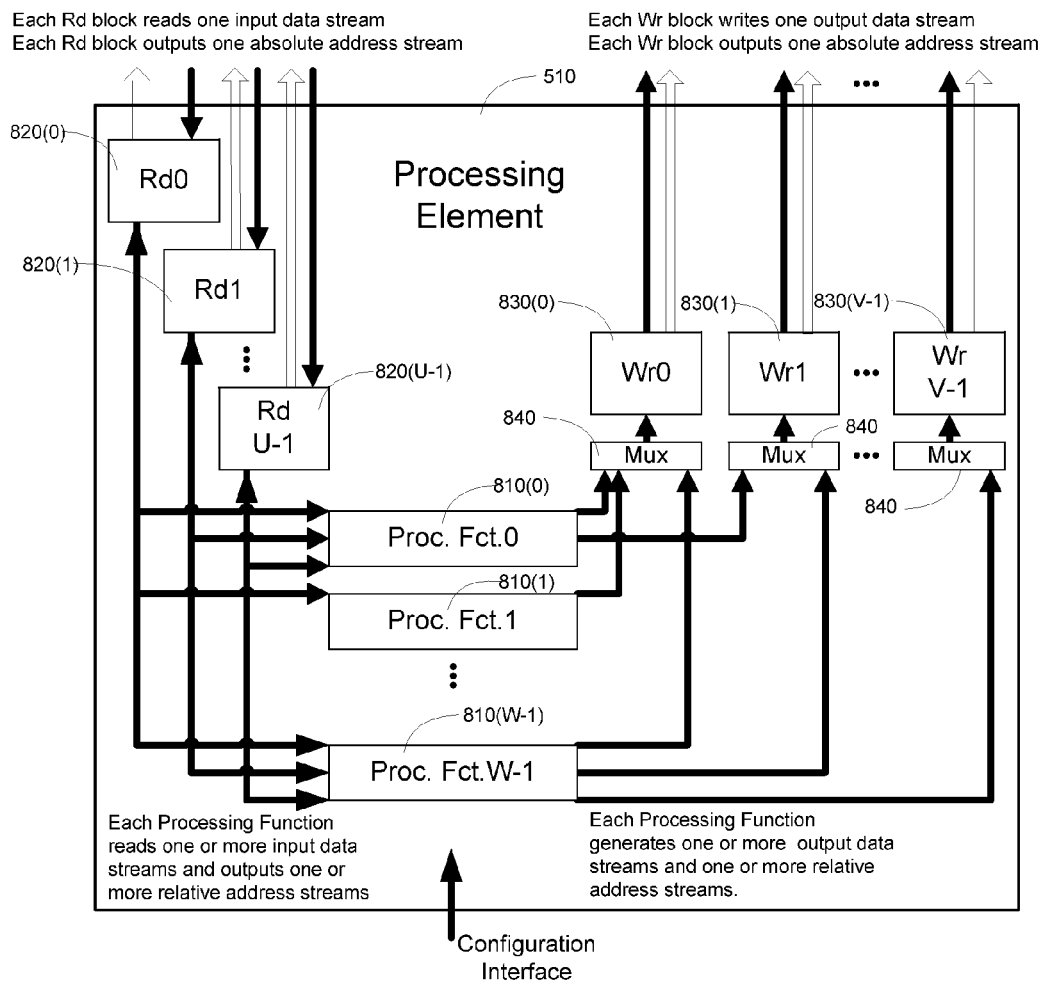
FIG. 8 shows a block diagram of the embodiment of the processing element.

FIG. 8 shows a block diagram of the processing element 510 shown in FIG. 5. The processing element comprises one or more processing functions 810(0) to 810(W-1), a number of read (Rd) blocks 820(0) to 820(U-1), a number of write (Wr) blocks 830(0) to 830(V-1) and multiplexers 840. Every processing function has one or more ports for input data streams and one or more ports for the output data streams. Each processing function has no knowledge on where the data stream is located in memory. It can provide a relative address stream to the Rd and Wr blocks to determine the order of the stream data elements. The Rd and Wr blocks add a configurable start address to the relative address stream to derive the absolute address stream. The Rd block then outputs the absolute address stream to the data memory. The Rd block reads data from the memory and provides a stream of data to the processing function. The Wr block receives a stream of data and a relative address stream from the processing function. The Wr block then outputs an absolute address stream to the data memory and writes the data to the memory. The data processing functions and the Rd/Wr blocks are configured via the processing element configuration interface.

Some processing functions may only require very simple address generation. The Rd/Wr blocks can then generate the absolute address directly and the relative address interface can be omitted.

The input data ports of different processing functions can share Rd blocks and Wr blocks, if they are not used in parallel. The connection between Rd/Wr blocks and the processing function are normally fixed for a processing element.

The SCU provides a separate configuration, a separate synchronous enable and a common trigger to each Rd-block 820, Wr-block 830 and processing function 810. Each block starts the configured operation when it is enabled and triggered. The trigger has no effect if the block is disabled. Each block asserts a done flag once the configured operation has completed. The SCU provides a new configuration once all enabled blocks in the SPU have asserted their done flag. The down time between two operations can be reduced if the result of one operation is not the input for the next operation. The Rd-blocks can then be triggered for the next operation, while the Wr-blocks still transfer the last few output samples of the previous operation.

The Rd block 820 reads data from the memory or an external input data port and provides a stream of data to one processing function. The Rd block does not distinguish between signed, unsigned, real or complex data. Different processing functions may interpret the data stream differently. The address generation in the Rd block is configured with a start address and an address generation mode. The Rd block samples the start address at the beginning of the operation. The address is then modified after every access according to the mode. The supported modes are configurable increment or decrement, relative (the processing function provides a relative address), fixed (the same address is read over and over again) and disabled (used if a stream of data is provided via the external input data interface).

The Wr block 830 receives a stream of data from a processing function and writes the data into the memory or to the external output data port. The address generation in Wr block is configured with a start address and an address generation mode. The Wr block samples the start address at the beginning of the operation and the address is then modified after every access according to the mode. The supported modes are increment, decrement, relative and fixed.

Each hardware arbiter 570 negotiates memory accesses between concurrent data streams. Only one memory access can happen in each cycle. In a typical scenario only some of the concurrent data streams require an access for every cycle. Rd blocks and Wr blocks provide buffering for the address stream and data stream. This smoothes the data flow in the system and mitigates throughput limitations due to memory arbitration.

The processing function does not typically store state information from one call to the next. Typical examples of processing functions are FFT/IFFT, vector and matrix operations, sorting and filter functions.

Every processing function has a synchronous enable and a trigger input port. The processing function is stalled when the enable is '0' and a pulse on the trigger input has no effect. The processing function starts its operation when the enable is '1' and a pulse is provided to the trigger input port.

The processing function reads one or more input data streams. Every data stream is provided via a separate Ready, Valid, Go (RVG) interface and is connected to a separate Rd block. The 'Ready' and 'Go' control signals of the data streams can be combined if the data is always required at the same point in time.

The processing function can provide a separate relative read address for every input data stream. The data is provided by the Rd block several cycles after the relative read address, due to the latency in the memory arbitration. This is handled by using separate RVG interfaces for address and data. Most processing functions do not require the generation of a relative address. It is only required if the processing function needs to read the input data in a specific order that is not supported by the Rd block.

The processing function generates one or more output data streams. Each data stream is provided via a separate RVG interface and is connected to a separate Wr block. The output data and the optional relative address are provided at the same time via an RVG interface. Most processing functions do not require the generation of a relative address. It is only required if the processing function needs to write the output data in a specific order that is not supported by the Wr block.

The SPU can buffer external input data in a FIFO, the size of which is configurable and generates new addresses as long as the FIFO is not critically full. The critical fill state is configurable. This solution allows single cycle data transfer, although the sender may have some latency between the reading of the address and the provision of the data. One example would be a data buffer with arbitrated memory.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A stream data processor, comprising:
   one or more stream input interfaces;
   one or more stream output interfaces;
   one or more memories;
   one or more stream processing units that implement data processing operations, each stream processing unit comprising a plurality of processing elements that implement processing operations and each processing element comprising one or more read-blocks and one or more write-blocks; and
   one stream control unit that provides configuration data to the stream processing units to perform sequencing of the data processing operations,
   wherein the stream control unit provides a separate configuration, a separate synchronous enable and a common trigger to each read-block and write-block, and
   wherein the stream control unit provides a new configuration to each read-block and write-block once each of the one or more read-blocks and one or more write-blocks has asserted a respective done flag indicating that a configured operation has completed.

2. The stream data processor according to claim 1, wherein the stream control unit comprises:
   one or more processing element configuration interfaces that interface to the stream processing unit;
   one or more top level configuration interfaces that interface to at least one higher level processor; and
   a finite state machine that executes a task by sequencing the data processing operations.

3. The stream data processor according to claim 1, wherein the stream control unit comprises:
   one or more processing element configuration interfaces that interface to the stream processing unit;
   one or more top level configuration interfaces that interface to at least one higher level processor; and
   a plurality of finite state machines configured to execute a plurality of independent tasks.

4. The stream data processor according to claim 1, wherein the stream control unit comprises:
   one or more processing element configuration interfaces that interface to the stream processing unit;
   one or more top level configuration interfaces that interface to at least one higher level processor; and
   a configuration register which is fed by a dedicated microprocessor that provides configuration sequences.

5. The stream data processor according to claim 1, wherein the stream control unit comprises:
   one or more processing element configuration interfaces that interface to the stream processing unit;
   one or more top level configuration interfaces that interface to at least one higher level processor; and
   a configuration register, fed by a finite state machine coupled with a FIFO containing regularly updated configuration sequences.

6. The stream data processor according to claim 1, wherein the stream control unit comprises:
   one or more processing element configuration interfaces that interface to the stream processing unit;
   one or more top level configuration interfaces that interface to at least one higher level processor; and
   a configuration register, fed by a finite state machine coupled with a ROM containing predetermined configuration sequences.

7. The stream data processor according to claim 1, wherein the stream processor unit comprises:
   one or more memory interfaces, each having one memory arbitration unit;
   each processing element corresponding to one processing element configuration interface;
   one stream input multiplexer; and
   one stream output multiplexer.

8. The stream data processor according to claim 7, wherein each memory arbitration unit arbitrates memory accesses requested from concurrent data streams, the concurrent data streams flow to and from the associated memory, and wherein the stream input multiplexer routes one or more concurrent data streams from the stream input interfaces, and from the memory arbitration units, to respective processing elements of the plurality of processing elements, and then from the respective processing elements to the stream output interfaces and to the memory arbitration units.

9. The stream data processor according to claim 7, wherein each processing element comprises:
   one or more processing functions that perform data stream operations,
   wherein the one or more read-blocks generate processing function input data streams by performing a sequence of read operations; and
   the one or more write-blocks forward processing function output data streams by performing a sequence of write operations.

10. The stream data processor according to claim 9, wherein each processing function comprises:
    one or more stream input data interfaces;
    one or more stream output interfaces; and,
    a configurable stream operation.

11. The stream data processor according to claim 10, wherein each input stream interface and output stream interface respectively comprise a relative-address stream interface, each relative-address stream interface having one relative-address generator.

12. The stream data processor according to claim 1, wherein each memory has a bit width tailored to application of the stream data processor.

* * * * *